United States Patent
Gendotti et al.

(10) Patent No.: US 11,971,511 B2
(45) Date of Patent: Apr. 30, 2024

(54) PANEL RADIATION DETECTOR COMPRISING A PLURALITY OF ADJOINING PLASTIC SCINTILLATOR SLABS AND A PLURALITY OF SILICON PHOTOMULTIPLIER (SIPM) SENSORS

(71) Applicant: Arktis Radiation Detectors Ltd., Zurich (CH)

(72) Inventors: Ulisse Gendotti, Zurich (CH); Christoph Philipp, Bad Ragaz (CH); Rico Chandrasekharan, Zurich (CH); Mohsen Meshkian, Brugg (CH)

(73) Assignee: Arktis Radiation Detectors Ltd., Zürich (CH)

( * ) Notice: Subject to any disclaimer, the term of this patent is extended or adjusted under 35 U.S.C. 154(b) by 38 days.

(21) Appl. No.: 17/602,868

(22) PCT Filed: Apr. 9, 2020

(86) PCT No.: PCT/EP2020/060279
§ 371 (c)(1),
(2) Date: Oct. 11, 2021

(87) PCT Pub. No.: WO2020/208203
PCT Pub. Date: Oct. 15, 2020

(65) Prior Publication Data
US 2022/0179106 A1 Jun. 9, 2022

(30) Foreign Application Priority Data
Apr. 12, 2019 (CH) ..................... 00508/19

(51) Int. Cl.
*G01T 1/167* (2006.01)
*G01T 1/17* (2006.01)
(Continued)

(52) U.S. Cl.
CPC .......... *G01T 1/20182* (2020.05); *G01T 1/167* (2013.01); *G01T 1/17* (2013.01);
(Continued)

(58) Field of Classification Search
CPC ........... A61B 6/03; A61B 6/032; A61B 6/035; A61B 6/037; A61B 6/42; A61B 6/4208;
(Continued)

(56) References Cited

U.S. PATENT DOCUMENTS 7,635,848 B2 * 12/2009 Nelson .................. G01T 1/2008
250/370.11
7,750,311 B2 * 7/2010 Daghighian ........... A61B 34/20
250/398
(Continued)

FOREIGN PATENT DOCUMENTS

CN 105980885 A 9/2016
CN 207623540 U 7/2018
(Continued)

OTHER PUBLICATIONS

Clemencio et al., "A fast, high-throughput digital coincidence detection system for a large RPC-PET camera", Journal of Instrumentation, Mar. 1, 2013, pp. 1-9, vol. 8:3.
(Continued)

*Primary Examiner* — Allen C. Ho
(74) *Attorney, Agent, or Firm* — The Webb Law Firm

(57) ABSTRACT

A panel radiation detector is provided for detecting radiation event(s) of ionizing radiation, comprising a plurality of adjoining plastic scintillator slabs, a plurality of silicon photomultiplier sensors arranged at an edge of at least one of the plastic scintillator slabs) and configured to detect scintillation light generated in the scintillator slabs responsive to the radiation events, and a plurality of signal processing units each connected to one of the silicon photo-
(Continued)

multiplier sensors, wherein the signal processing units each comprise a digitization circuit configured to generate a digitized signal for signal analysis by executing 1-bit digitization of a detection signal generated by at least one of the silicon photomultiplier sensors responsive to the detected scintillation light for determining the energy of the detected radiation event(s).

24 Claims, 13 Drawing Sheets

(51) Int. Cl.
*G01T 1/172* (2006.01)
*G01T 1/20* (2006.01)
*G01T 1/203* (2006.01)
*G01T 1/24* (2006.01)
*G01T 1/29* (2006.01)
*G01T 1/36* (2006.01)
*G01V 5/00* (2006.01)
*G01V 5/20* (2024.01)

(52) U.S. Cl.
CPC .......... *G01T 1/172* (2013.01); *G01T 1/20181* (2020.05); *G01T 1/20184* (2020.05); *G01T 1/203* (2013.01); *G01T 1/242* (2013.01); *G01T 1/243* (2013.01); *G01T 1/248* (2013.01); *G01V 5/20* (2024.01)

(58) Field of Classification Search
CPC ... A61B 6/4225; A61B 6/4233; A61B 6/4241; A61B 6/4258; A61B 6/4266; A61B 6/4275; A61B 6/482; A61B 6/483; A61B 6/52; A61B 6/5205; A61B 6/4283; G01N 23/221; G01N 23/222; G01T 1/167; G01T 1/2006; G01T 1/2018; G01T 1/20181; G01T 1/20182; G01T 1/20184; G01T 1/20185; G01T 1/20186; G01T 1/20187; G01T 1/20188; G01T 1/203; G01T 1/2033; G01T 1/16; G01T 1/1606; G01T 1/163; G01T 1/164; G01T 1/1641; G01T 1/1644; G01T 1/166; G01T 1/169; G01T 1/17; G01T 1/172; G01T 1/20; G01T 1/24; G01T 1/242; G01T 1/243; G01T 1/248; G01T 1/249; G01T 1/29; G01T 1/2907; G01T 1/2914; G01T 1/2921; G01T 1/2928; G01T 1/2964; G01T 1/2971; G01T 1/2985; G01T 1/36; G01T 1/362; G01T 1/366; G01V 5/0008; G01V 5/0069; G01V 5/0075
USPC .............. 250/370.09, 370.1, 370.11, 370.14; 376/156–159; 378/5, 19, 57, 98.8, 98.9
See application file for complete search history.

(56) References Cited

U.S. PATENT DOCUMENTS

| 7,800,070 | B2* | 9/2010 | Weinberg .............. G01T 1/1617 |
| | | | 250/370.06 |
| 8,068,896 | B2* | 11/2011 | Daghighian .............. G01T 1/20 |
| | | | 250/252.1 |
| 9,134,440 | B2* | 9/2015 | Sanuki .................. G01T 1/2928 |
| 9,360,563 | B2* | 6/2016 | Perna .................... G01T 1/2006 |
| 9,606,245 | B1* | 3/2017 | Czarnecki ............... G01T 1/208 |
| 9,835,735 | B2* | 12/2017 | Preston .................... G01T 1/02 |
| 9,952,336 | B2* | 4/2018 | Yang ................... G01T 1/20184 |
| 10,028,712 | B2* | 7/2018 | Allinson ............... G01T 1/2985 |
| 10,228,471 | B2 | 3/2019 | Benlloch Baviera et al. |
| 10,274,610 | B2* | 4/2019 | Nelson .................. G01T 1/2002 |
| 10,416,295 | B2* | 9/2019 | Warburton ............... G01T 1/17 |
| 10,509,135 | B2* | 12/2019 | Nelson .................... A61B 6/032 |
| 10,605,930 | B2* | 3/2020 | McLaughlin, II .. G01T 1/20185 |
| 10,838,088 | B2* | 11/2020 | Xu ......................... G01T 1/2018 |
| 11,054,530 | B2* | 7/2021 | Menge .................. G07D 7/1205 |
| 11,115,045 | B2* | 9/2021 | Furenlid ............... H03M 3/424 |
| 11,116,459 | B2* | 9/2021 | Dejongh ............... A61B 6/4258 |
| 11,262,462 | B2* | 3/2022 | Myers ..................... G01T 1/171 |
| 11,280,918 | B2* | 3/2022 | Nishihara ................ H04N 5/04 |
| 2012/0068076 | A1 | 3/2012 | Daghighian |
| 2016/0266260 | A1 | 9/2016 | Preston |
| 2017/0329024 | A1 | 11/2017 | Yang et al. |
| 2018/0292549 | A1 | 10/2018 | Xu et al. |

FOREIGN PATENT DOCUMENTS

| CN | 108502160 A | 9/2018 |
| GB | 2560552 A | 9/2018 |
| JP | 2018500545 A | 1/2018 |
| WO | 2017097147 A1 | 6/2017 |
| WO | 2019028205 A1 | 2/2019 |

OTHER PUBLICATIONS

Farthouat, "Signal Conditioning and Digitization for the ATLAS Experiment: Tutorial 46", IEEE Instrumentation & Measurement Magazine, Feb. 1, 2014, pp. 8-18, vol. 17:1.

Heijne et al., "Development of Silicon Pixel Detectors: An Introduction", Nuclear Instruments and Methods in Physics Research, Mar. 1, 1989, pp. 467-471, vol. 275:3.

Maxim Integrated, "Tutorial 810 Understanding Flash ADCS", 2014, pp. 1-9, (http://www.maximintegrated.com/en/an810).

* cited by examiner

PANEL RADIATION DETECTOR COMPRISING A PLURALITY OF ADJOINING PLASTIC SCINTILLATOR SLABS AND A PLURALITY OF SILICON PHOTOMULTIPLIER (SIPM) SENSORS

CROSS-REFERENCE TO RELATED APPLICATIONS

This application is the United States national phase of International Application No. PCT/EP2020/060279 filed Apr. 9, 2020, and claims priority to Swiss Patent Application No. 00508/19 filed Apr. 12, 2019, the disclosures of each of which are hereby incorporated by reference in their entireties.

BACKGROUND OF THE INVENTION

Field of the Invention

The present invention relates to a panel radiation detector for detecting radiation events of ionizing radiation and a method for processing a detection signal of a panel radiation detector for detecting radiation events of ionizing radiation.

Description of Related Art

Radiation detectors comprising scintillators are widely used for detecting ionizing radiation, especially for detecting nuclear and/or radiological sources, in particular special nuclear material (SNM). The detection is performed by measuring the scintillation light generated when radiation interacts with the scintillating material of the scintillator.

Conventionally, the readout of scintillation light of radiation detectors has been performed by using photomultiplier tubes (PMTs). Recently, solid-state detectors such as silicon photomultiplier (SiPM) sensors have emerged as a beneficial alternative for the light readout of scintillators. Compared to PMTs, SiPM sensors offer the advantages of low-power operation, small volume, mechanical robustness, and insensitivity to magnetic fields. By using SiPM sensors, it is possible to obtain smaller radiation detectors where the SiPM sensors can be attached to the scintillator in a flexible fashion, as compared to PMTs. Furthermore, the need for light guides can be avoided. A SiPM comprises a dense array of single-photon avalanche diode (SPAD) sensors operating in Geiger mode. Further, the SiPM integrates a plurality of quenching resistors, which are each coupled to a SPAD sensor. A SPAD sensor with its quenching resistor forms a microcell, where typical SiPMs exhibit microcell densities of between 100 and several 1000 per $mm^2$.

Regarding the scintillators, plastic scintillators have shown to be an inexpensive solution for detecting various kinds of ionizing radiation. The plastic scintillator material typically used is polyvinyltoluene (PVT), PET, polystyrene or another organic material. However, using plastic scintillators for spectroscopic measurements is known to be difficult due to their poor energy resolution compared to e.g. crystal scintillators with high atomic numbers.

SUMMARY OF THE INVENTION

In developing radiation detectors for detecting ionizing radiation, it is desired to improve the detection sensitivity and efficiency on the one hand, and to improve the cost-effectivity on the other hand. Both can be aimed for by improving on the configuration of the sensor part of the radiation detector and/or on the electronics part for signal processing.

It is therefore an object of the present invention to provide a radiation detector comprising a plastic scintillator and to provide a method for processing a detection signal of a radiation detector which at least partially improves the prior art and avoids at least part of the disadvantages of the prior art. According to the present invention, this object is achieved by the features described herein. In addition, further advantageous embodiments follow from the description as well as the figures. According to an aspect of the invention, this object is particularly achieved by a panel radiation detector for detecting radiation events of ionizing radiation, comprising a plurality of adjoining plastic scintillator slabs, a plurality of silicon photomultiplier sensors arranged at an edge of at least one of the plastic scintillator slabs and configured to detect scintillation light generated in the scintillator slabs responsive to the radiation events, and a plurality of signal processing units each connected to one of the silicon photomultiplier sensors, wherein the signal processing units each comprise a digitization circuit configured to generate a digitized signal for signal analysis by executing 1-bit digitization of a detection signal generated by at least one of the silicon photomultiplier sensors responsive to the detected scintillation light for determining the energy of the detected radiation events.

By providing a plurality of adjoining plastic scintillator slabs, a segmented radiation detector can be realized, where each scintillator slab can independently be read out by the silicon photomultiplier (SiPM) sensors arranged at at least one edge of at least one of the plastic scintillator slabs. Preferably, each scintillator slab features one edge or more edges where a plurality of silicon photomultiplier sensors is arranged.

The term "edge" in connection with the scintillator slab is typically understood as being the lateral edge of a scintillator slab. In some embodiments, however, the edge may be, alternatively or in addition, understood as the top and/or bottom surface of a plastic scintillator slab.

Depending on the specific need and the desired geometry of the radiation detector, the plastic scintillator slabs or the panel radiation detector, respectively, can be arranged in a highly flexible fashion. The arrangement of the plastic scintillator slabs together with the small size of the SiPM sensors advantageously enables to significantly decrease the thickness of the panel radiation detector. Accordingly, the panel radiation detector according to the present invention is also referred to as "flat panel gamma detector". The low cost of the SiPM sensors allows to arrange a plurality of SiPM sensors at the edges of the scintillator slabs which increases the sensitivity and the spatial resolution of radiation detection.

In particular, the aspect ratio d/l and/or d/w of the plastic scintillator slab, with d the thickness, l the length and w the width of the plastic scintillator slab, is preferably below unity. In an embodiment, the aspect ratio d/l and/or d/w is between 0.01 and 0.2.

Furthermore, the thickness of the plastic scintillator is preferably on the order of a side of the active area of one of the SiPM sensors. In an embodiment, the thickness of the plastic scintillator slab is one to five times, preferably one to two times, a side of the active area of one of the SiPM sensors. The aspect ratio of the plastic scintillator slabs and the thickness of the plastic scintillator slabs being comparable to a side of the active area of the SiPM sensors advantageously leads to a high light collection capability.

Independent readout of the SiPM sensors is enabled by the plurality of signal processing units each assigned to one of the SiPM sensors. Therein, a cost-effective and simple signal processing electronics is advantageously provided by the digitization circuits configured to execute 1-bit digitization of an analog detection signal generated by at least one of the SiPM sensors upon detection of scintillation light generated in one of the scintillator slabs due to a radiation event. The detection signal of the SiPM sensors may be processed by various intermediate processing steps, as described further below, including e.g. pre-amplifying, amplifying, pulse-shaping etc., before being digitized by the digitization circuit. In particular, the digitized signal is generated by 1-bit digitization for determining the energy of the detected radiation events. Using the digitization circuit configured to execute 1-bit digitization provides the advantage of a simple and effective analog-to-digital conversion technique for processing the detection signals of the SiPM sensors and for determining the energy of a detected radiation event.

In the context of the present invention, pulse-shaping is understood as signal-shaping, i.e. shaping a signal by electronic circuitry, and is to be distinguished from pulse-shape discrimination (PSD), which is a technique used in scintillators to discriminate between signals of different types of radiation, as understood by the person skilled in the art.

Preferably, the panel radiation detector comprises an analyzing circuit connected to the digitization circuits and configured to determine the energy of a detected radiation event using the digitized signal of one or more of the digitization circuits.

The digitization circuit allows to generate a digitized signal with information on the time interval during which the detection signal is above a predetermined threshold value. From the digitized signal, the analyzing circuit may execute pulse width analysis of the detection signal and determine the energy of the detected radiation event. Preferably, the analog detection signal is pulse-shaped by a pulse-shaping circuit before being digitized by the digitization circuit.

Compared to obtaining energy information by integrating the detection signal, i.e. determining the area below the detection signal, the panel radiation detector comprising the digitization circuit configured to execute 1-bit digitization advantageously allows to determine the energy of the radiation event from the pulse width of the detection signal above a predetermined threshold, as determined by the digitization circuit. Using the pulse width and a characteristic decay component due to the plastic scintillator material and/or the components of the electronic circuitry of the panel radiation detector, the energy of the detected radiation event can be determined by the analyzing circuit. Thus, the panel radiation detector provides the advantage of a simplified signal processing to obtain energy information compared to obtaining energy information by integrating the detection signal.

In an embodiment, the sampling rate of the digitization circuit is around 10 ns.

Determining the energy of a radiation event by integrating the detection signal commonly requires around 8 to 10 bit digitizers with a sampling rate of around 1 to 100 ns for every channel. Placing several SiPMs around a scintillator surface requires a multitude of channels to be processed, such that the common approach with 8-10 bit digitizers to extrapolate the charge integral from each SiPM makes the signal processing laborious. Thus, determining the energy of a radiation event from the pulse width using 1-bit digitization as described herein provides a simplification of signal processing and increases the detection efficiency.

The combination of increased light collection due to improved total internal reflection within the plastic scintillator slabs by virtue of their geometry and arrangement, with the processing scheme using pulse width analysis with 1-bit digitization as described herein, allows to obtain sufficient spectral resolution to perform spectroscopy, which has not been possible in the prior art using common plastic scintillator detectors, especially common plastic scintillator blocks.

The plastic scintillator material may comprise polyvinyltoluene (PVT), PET, polystyrene or another organic material.

The spaces between the SiPM sensors and the plastic scintillator slabs may be filled with optical grease in order to increase the optical coupling.

The panel radiation detector is particularly suitable to detect gamma radiation. However, detection capability of other radiation, such as alpha or beta radiation may alternatively or additionally be provided.

The person skilled in the art understands that the plastic scintillator slabs may adjoin to each other without having direct contact to each other. For example, the interface between neighboring scintillator slabs may feature sufficient space to accommodate SiPM sensors, PCBs, optical grease etc.

In an embodiment, the plastic scintillator slab has a thickness which is between one time and five times a side of the area of a SiPM sensor. Advantageously, this allows the scintillation light to be transported to the SiPM sensor by total internal reflection within the scintillator slab.

In an embodiment, at least two plastic scintillator slabs are laterally adjoining to each other.

In an embodiment, at least two plastic scintillator slabs are vertically stacked on top of each other. By vertically stacking scintillator slabs, a multi-layer panel radiation detector can be obtained, which advantageously preserves the benefits of a thin scintillator which optimizes the light collection. At the same time, a decreased efficiency of the thin scintillator for high energy radiation can be overcome due to the multi-layer structure. In the context of the present invention, the term "panel radiation detector" is understood to comprise also embodiments of multi-layer panel radiation detectors, i.e. panel radiation detectors comprising a multi-layer structure of scintillator slabs.

In an embodiment, the panel radiation detector comprises at least one first plastic scintillator slab and at least one second plastic scintillator slab which are vertically stacked on top of each other, wherein the at least one first plastic scintillator slab has a smaller thickness than the thickness of the at least one second plastic scintillator slab. Thus, a multi-layer, in particular two-layer, panel radiation detector can be provided with a thinner front panel operating as a low energy detection panel, comprising the at least one first plastic scintillator slab and with a thicker rear panel operating as a high energy detection panel, comprising the at least one second plastic scintillator slab.

The thickness of the at least one second plastic scintillator slab may be 4 to 20 times, preferably 6 to 15 times, particularly preferably 8 to 10 times larger than the thickness of the at least one first plastic scintillator slab.

Preferably, the thinner front panel and the thicker rear panel are arranged such that the thinner front panel is closer to the radiation source in question than the thicker rear panel. This can be achieved for example by placing the thinner front panel next to a monitoring area of the panel radiation detector where a radiation source in question is to be placed for scanning by the panel radiation detector, and by placing the thicker rear panel behind the thinner front panel with respect to the monitoring area. For example, the thinner front panel is arranged next to the passage of a radiation detecting hallway and the thicker rear panel is arranged behind the thinner front panel with respect to the passage of the radiation detecting hallway.

Using two layers comprising first and second plastic scintillator slabs with different thicknesses provides the advantage that the sensitivity of the panel radiation detector to both low energy gamma radiation and high energy gamma radiation can be improved. Thus, the range of energy for which the panel radiation detector is capable to detect gamma radiation can be increased. Furthermore, the at least one first plastic scintillator slab and the at least one second plastic scintillator slab are preferably designed to exhibit thicknesses such that the at least one first plastic scintillator slab is predominantly sensitive to low energy gamma radiation without being sensitive to high energy gamma radiation, and that the at least one second plastic scintillator slab is predominantly sensitive to high energy gamma radiation without being sensitive to low energy gamma radiation. Thus, by using vertically stacked plastic scintillator slabs with different thicknesses, multiple, in particular two, layers with selective detection capabilities depending on the energy of the gamma radiation can be provided.

The at least one first plastic scintillator slab is preferably configured to exhibit a thickness which is optimized to detect low energy gamma radiation. Typically, detection of low energy gamma radiation is adversely affected by increasing the thickness of a plastic scintillator due to the small amount of energy deposits from interaction of the low energy gamma radiation. By reducing the thickness of the plastic scintillator slabs, as for the at least one first plastic scintillator slab, the light collection efficiency can be increased such that even small amounts of energy deposits from low energy gamma radiation interaction can be detected, while the efficiency of detecting high energy gamma radiation may yet be low due to insufficient attenuation.

Preferably, the thickness of the at least one first plastic scintillator slab is on the order of a side of the active area of one of the silicon photomultiplier sensors arranged at an edge of the at least one first plastic scintillator slab. In an embodiment, the thickness of the at least one first plastic scintillator slab is 1-4 times, preferably 1-2 times, a side of the active area of one of the silicon photomultiplier sensors arranged at an edge of the at least one first plastic scintillator slab. In an embodiment, the thickness of the at least one first plastic scintillator slab is between 3-15 mm, preferably between 5-10 mm.

In an embodiment, the thinner front panel comprises a plurality of laterally adjoining first plastic scintillator slabs and a plurality of silicon photomultiplier sensors arranged at an edge of at least one of the first plastic scintillator slabs and configured to detect scintillation light generated in the first plastic scintillator slabs. Thus, a segmented radiation detector for low energy gamma radiation can be provided by the thinner front panel. Providing a plurality of laterally adjoining first plastic scintillator slabs for the thinner front panel provides the advantage that the signal-to-noise ratio can be improved. Due to a larger number of silicon photomultiplier sensors arranged between the plurality of laterally adjoining first plastic scintillator slabs, the path of the scintillation light between generation and detection can be reduced which enables improvement of the light collection efficiency.

In an embodiment, the area of a first plastic scintillator slab of the plurality of laterally adjoining first plastic scintillator slabs is between 10'000 mm$^2$ and 14'000 mm$^2$, preferably between 11'000 mm$^2$ and 13'000 mm$^2$, particularly preferably around 12'000 mm$^2$.

In an embodiment, the thinner front panel comprises between 5 to 15, preferably between 7 to 13, particularly preferably around 10, laterally adjoining first plastic scintillator slabs.

The at least one second plastic scintillator slab is preferably configured to exhibit a thickness which is optimized to detect high energy gamma radiation. In particular, the thickness is preferably optimized such that attenuation is sufficient in order to enable detection of the high energy gamma radiation. The light collection efficiency of the at least one second plastic scintillator slab is typically about an order of magnitude lower than the one of the at least one first plastic scintillator slab. However, since high energy gamma radiation deposits sufficient energy to create large amounts of scintillation light, as compared to low energy gamma radiation, the at least one second plastic scintillator slab is sufficiently sensitive to detect high energy gamma radiation while the efficiency of detecting low energy gamma radiation may yet be low due to attenuation in the at least one second plastic scintillator slab.

In an embodiment, the thicker rear panel comprises a single second plastic scintillator slab with a plurality of silicon photomultiplier sensors arranged at an edge of the second plastic scintillator slab. In an alternative embodiment, the thicker rear panel comprises two, three or four or more second plastic scintillator slabs. Preferably, the number of first plastic scintillator slabs is larger than the number of second plastic scintillator slabs.

In an embodiment, the thickness of the at least one second scintillator slab is between 20 to 60 mm, preferably between 30 to 50 mm, particularly preferably around 40 mm.

In an embodiment, the area of the at least one second plastic scintillator slab is between 100'000 mm$^2$ and 140'000 mm$^2$, preferably between 110'000 mm$^2$ and 130'000 mm$^2$, particularly preferably around 120'000 mm$^2$. In embodiments with two, three or four laterally adjoining second plastic scintillator slabs, the total area of the laterally adjoining second plastic scintillator slabs may be between 100'000 mm$^2$ and 140'000 mm$^2$, preferably between 110'000 mm$^2$ and 130'000 mm$^2$, particularly preferably around 120'000 mm$^2$.

In the context of the present invention, low energy gamma radiation is preferably understood to comprise gamma radiation of an energy between 30 keV and 150 keV, and high energy gamma radiation to comprise gamma radiation of preferably an energy higher than 150 keV.

In an embodiment, the panel radiation detector comprises a thinner front panel with a plurality of laterally adjoining first plastic scintillator slabs and a thicker rear panel with a single second plastic scintillator slab.

In an embodiment, the panel radiation detector comprises additional vertically stacked slabs with thicknesses differing from each other depending on the layer and differing from the ones of the first and second slabs, the additional vertically stacked slabs forming additional layers, each with a high sensitivity to a different range of energy of gamma radiation.

In the same panel radiation detector, some of the scintillator slabs may be laterally adjoining and some of the scintillator slabs may be vertically adjoining.

In a preferred embodiment, the panel radiation detector comprises a joint signal processing board. Preferably, the processing units and the analyzing circuit are integrated on a joint signal processing board of the panel radiation detector, forming an integrated signal processing system of the panel radiation detector.

In an embodiment, the panel radiation detector comprises a joint analyzing circuit connected to the digitization circuits and configured to perform signal analysis by executing the steps of: determining coincident digitized signals associated with a radiation event, summing up the coincident digitized signals associated with the radiation event, and determining the pulse width of the summed up signal for determining the energy of the radiation event. Thus, the joint analyzing circuit may operate as the analyzing circuit described above.

Using a joint analyzing circuit for all or a group of processing units provides the advantage that the costs can be reduced and the architecture of the panel radiation detector be simplified, while still enabling independent readout of the SiPM sensors. In an embodiment, the joint analyzing circuit performs signal analysis of the detection signal of a group of 4 to 8 SiPM sensors. The coincident digitized signals associated with a radiation event may be determined using a coincidence logic applied by the joint analyzing circuit. The coincidence logic is typically performed for a specific scintillator slab and requires two or more SiPM sensors to generate a 1-bit high response, i.e. the detection signal to be above a threshold, within a predefined coincidence time window. Typically, the coincidence time window is between 10 to 100 ns, but may be varied depending on the specific application. Therefore, signals may be considered to be coincident when occurring within a pre-defined coincidence time window with a strength exceeding a specific threshold. Determining the pulse width of the summed up signal digitized by the digitization circuit provides an efficient way to obtain spectral information and to determine the energy of the radiation event. In particular, the joint analyzing circuit may be configured to execute pulse width analysis while the detection signal is above a threshold value, as determined from the digitized signal of the digitization circuit. To obtain spectral information and to determine the energy of the radiation event, a characteristic decay component due to the plastic scintillator material and/or the components of the electronic circuitry, may be used in addition to the pulse width of the summed up signal.

In particular, determining the pulse width of the summed up signals to obtain spectral information advantageously allows to simplify signal processing compared to obtaining energy information by determining the area below the signals.

In an embodiment, the joint analyzing circuit is configured to separately perform for each scintillator slab signal analysis of the detection signals generated by the silicon photomultiplier sensors responsive to detected scintillation light originating from the scintillator slab.

Therefore, independent readout of each scintillator slab by the joint analyzing circuit can be achieved which allows to exploit the advantages of a segmented radiation detector, for example by correlating the signals originating from different scintillator slabs.

In an embodiment, the panel radiation detector comprises a pre-amplifying circuit configured to pre-amplify the detection signal and a pulse-shaping circuit configured to pulse-shape the pre-amplified detection signal, wherein the digitization circuit is configured to execute 1-bit digitization of the pulse-shaped detection signal.

Preferably, the processing units each comprising a pre-amplifying circuit, a pulse-shaping circuit and a digitization circuit as well as the joint analyzing circuit are integrated on a single signal processing board of the panel radiation detector.

In an embodiment, the digitization circuit comprises a discriminator arranged after the pulse-shaping circuit.

The combination of the plastic scintillator slabs and the electronics comprising the digitization circuit configured to execute 1-bit digitization and the joint analyzing circuit configured to execute pulse width analysis for obtaining spectral information and for determining the energy advantageously results in a highly effective detection capability with high spectral resolution of the detected radiation events. The panel radiation detector represents a cost-effective and highly sensitive radiation detecting system using a plurality of plastic scintillators and a plurality of SiPM sensors which allow to independently read out the plastic scintillators in an efficient fashion.

In an embodiment, between two to eight, preferably four to six, silicon photomultiplier sensors, preferably arranged on an elongated strip and equally spaced from each other, are arranged at an edge of at least one of the plastic scintillator slabs.

In an embodiment, the strip comprises a first surface and an oppositely arranged second surface, wherein at least one of the SiPM sensors is arranged on the first surface and at least one of the SiPM sensors is arranged at the second surface of the strip. The at least one of the SiPM sensors arranged at the first surface may be configured to detect the scintillation light of a first scintillator slab wherein the at least one of the SiPM sensors arranged at the second surface may be configured to detect the scintillation light of a second scintillator slab.

In an embodiment, the scintillator slabs are rectangular with a long edge and a short edge, wherein at least a portion of the scintillator slabs adjoin along their long edges.

Alternatively or in addition, at least a portion of the scintillator slabs may adjoin along their short edges.

In an embodiment, the scintillator slabs are rectangular with a long edge and a short edge, wherein a plurality of scintillator slabs adjoins a single scintillator slab along its long edge by their short edges.

The scintillator slabs may be arranged in a flexible fashion depending on the needs of the radiation detection. Since the SiPM sensors are small and versatile in geometric arrangement, the arrangement of the scintillator slabs may not or only weakly be affected by requirements of the SiPM sensors. Furthermore, the sizes of each scintillator slabs can be designed differently, which increases the range of application for the panel radiation detector. Apart from the rectangular design, the scintillator slabs may have, in some embodiments, other polygonal shapes.

The signal processing components may at least partly be arranged on a signal processing board. For example, the signal processing board may be arranged at a common edge of at least a portion of the scintillator slabs.

According to a further aspect, the present invention is also directed to a method for processing a detection signal of a panel radiation detector for detecting radiation events of ionizing radiation according to the present invention, the panel radiation detector comprising a plurality of adjoining plastic scintillator slabs, a plurality of silicon photomultiplier sensors arranged at an edge of at least one of the plastic scintillator slabs, and a plurality of signal processing units each connected to one of the silicon photomultiplier sensors and each comprising a digitization circuit, wherein the method comprises: Detecting scintillation light generated in the scintillator slabs by the silicon photomultiplier sensors; generating a detection signal by at least one of the silicon photomultiplier sensors responsive to the detected scintillation light; generating a digitized signal for signal analysis by executing 1-bit digitization of the detection signal by the digitization circuit for determining the energy of the detected radiation events.

Preferably, the panel radiation detector comprises an analyzing circuit connected to the digitization circuits, wherein the analyzing circuit determines the energy of a detected radiation event using the digitized signal of one or more of the digitization circuits.

In an embodiment, the panel radiation detector comprises a joint analyzing circuit connected to the digitization circuits, wherein the joint analyzing circuit performs signal analysis by executing the steps of: determining coincident digitized signals associated with a radiation event, summing up the coincident digitized signals associated with the radiation event, and determining the pulse width of the summed up signal for determining the energy of the radiation event.

In an embodiment, the joint analyzing circuit separately performs for each scintillator slab signal analysis of the detection signals generated by the silicon photomultiplier sensors responsive to detected scintillation light originating from the scintillator slab.

In an embodiment, the panel radiation detector comprises a pre-amplifying circuit and a pulse-shaping circuit, wherein the method further comprises: pre-amplifying of the detection signal by the pre-amplifying circuit, pulse-shaping the pre-amplified detection signal by the pulse-shaping circuit, executing 1-bit digitization of the pulse-shaped detection signal by the digitization circuit. Advantageously, sufficient statistics of the detection signal is aggregated such that a spectrum may be obtained. The statistics may be sufficient, for example, if more than 100'000 entries are aggregated.

In an embodiment, the obtained spectrum is compared to a library stored at a data store, such that the radiation source type can be identified.

The method comprising executing analog-to-digital conversion by 1-bit digitization of the detection signal and obtaining spectral information by the joint analyzing circuit provides the advantage of a cost-effective signal processing method for a radiation detection system comprising one or more plastic scintillators and one or more SiPM sensors.

According to a further aspect, the present invention is also directed to a radiation detecting hallway comprising a plurality of panel radiation detectors according to the present invention, wherein the radiation detecting hallway comprises a first pillar, wherein rows of panel radiation detectors are sequentially arranged on top of each other within the first pillar.

The small thickness of the panel radiation detector allows to integrate the panel radiation detector into millimeter wave body scanners and/or metal detectors. By using a single pillar or wall, a "sensing wall" for detecting radiation sources carried on pedestrians can be provided. The radiation detecting hallway can advantageously be used for border control and/or airport security etc. The radiation detecting hallway may further comprise a millimeter wave imaging scanner, a video camera etc.

In an embodiment, the radiation detecting hallway further comprises a second pillar, wherein rows of panel radiation detectors are sequentially arranged on top of each other within the second pillar and wherein the first and the second pillar define a radiation detecting area between the first and the second pillar.

The person to be scanned may be positioned in the radiation detecting area. The rows of panel radiation detectors with independently readable scintillator slabs can be used to localize a radiation source on a person being scanned in the radiation detecting hallway.

According to a further aspect, the present invention is also directed to a method for operating a radiation detecting hallway according to the present invention, the method comprising processing a detection signal of the panel radiation detector according to the present inventive method, wherein the method further comprises localizing a source of ionizing radiation within the radiation detecting hallway by correlating the strength of the detection signals of the silicon photomultiplier sensors of different rows.

The independent readout of the plastic scintillator slabs allows to perform correlation analysis of the strength of the detection signals and to use the correlation information to localize a radiation source on a person being scanned. A radiation source localized to a small area of the person, for example around a foot of the person, may point to a radiological threat and trigger further examination of the person. In contrast, a radiation source which may be localized over a large area, for example over the whole body of a person, may point to radiological sources such as originating from nuclear medicine. The detected radiation events may therefore be localized to a "center of gravity" of the occurred radiation events, wherein a point-like center of gravity may point to a potential threat and a smeared-out center of gravity may point to a licit radiological source. The radiation detecting hallway provides the advantage that the need for an occupancy sensor, as for example used in radiation portal monitoring systems, may be avoided. The fusion of the spatial localization capability of the segmented panel radiation detector with data from a video camera allows to scan a continuous stream of goods or pedestrians, respectively, without having to deploy an occupancy sensor for detecting a non-continuous occupancy in the hallway.

According to a further aspect, the present invention is directed to a radiation detecting drone comprising a panel radiation detector according to the present invention.

When equipping drones with radiation detection capability, the radiation detecting sensitivity per payload plays an important role. By providing a panel radiation detector to be installed in a drone, the sensitivity per weight can optimally be increased due to the plastic scintillator slabs having a small thickness while covering a large area. Together with the lightweight and small SiPM sensors, the panel radiation detector therefore allows to achieve highly efficient, low-cost, radiation detecting drones.

In an embodiment, the panel radiation detector of the radiation detecting drone comprises a central scintillator slab and at least two, preferably three or four, peripheral scintillator slabs adjoining the central scintillator slab on at least two of its edges, wherein the silicon photomultiplier sensors are arranged at an edge of the central scintillator slab and at an edge of at least one of the peripheral scintillator slabs.

Preferably, each scintillator slab features an edge where a plurality of silicon photomultiplier sensors is arranged.

Arranging the plastic scintillator slabs in this fashion and independently reading out each scintillator slab allows the radiation detecting drone to extract directionality information of the detected radiation.

In particular, the radiation detecting drone may comprise a directionality unit configured to determine the directionality of the incident ionizing radiation by correlating the strengths of detection signals of the silicon photomultiplier sensors.

Determining the directionality of the incident ionizing radiation may have the advantage that the radiation detecting drone can reduce the area which the drone has to scan. While a radiation detecting drone with a conventional radiation detector has to scan a complete area in a grid pattern, the radiation detecting drone comprising a panel radiation detector according to the present invention can reduce the scanning pattern due to the directionality information and approach the radiation source more directly. Therefore, the scan time may be reduced which allows for a larger radiation detector payload for the drone.

BRIEF DESCRIPTION OF THE DRAWINGS

The present invention will be explained in more detail, by way of exemplary embodiments, with reference to the schematic drawings, in which.

DETAILED DESCRIPTION

Figure 1:
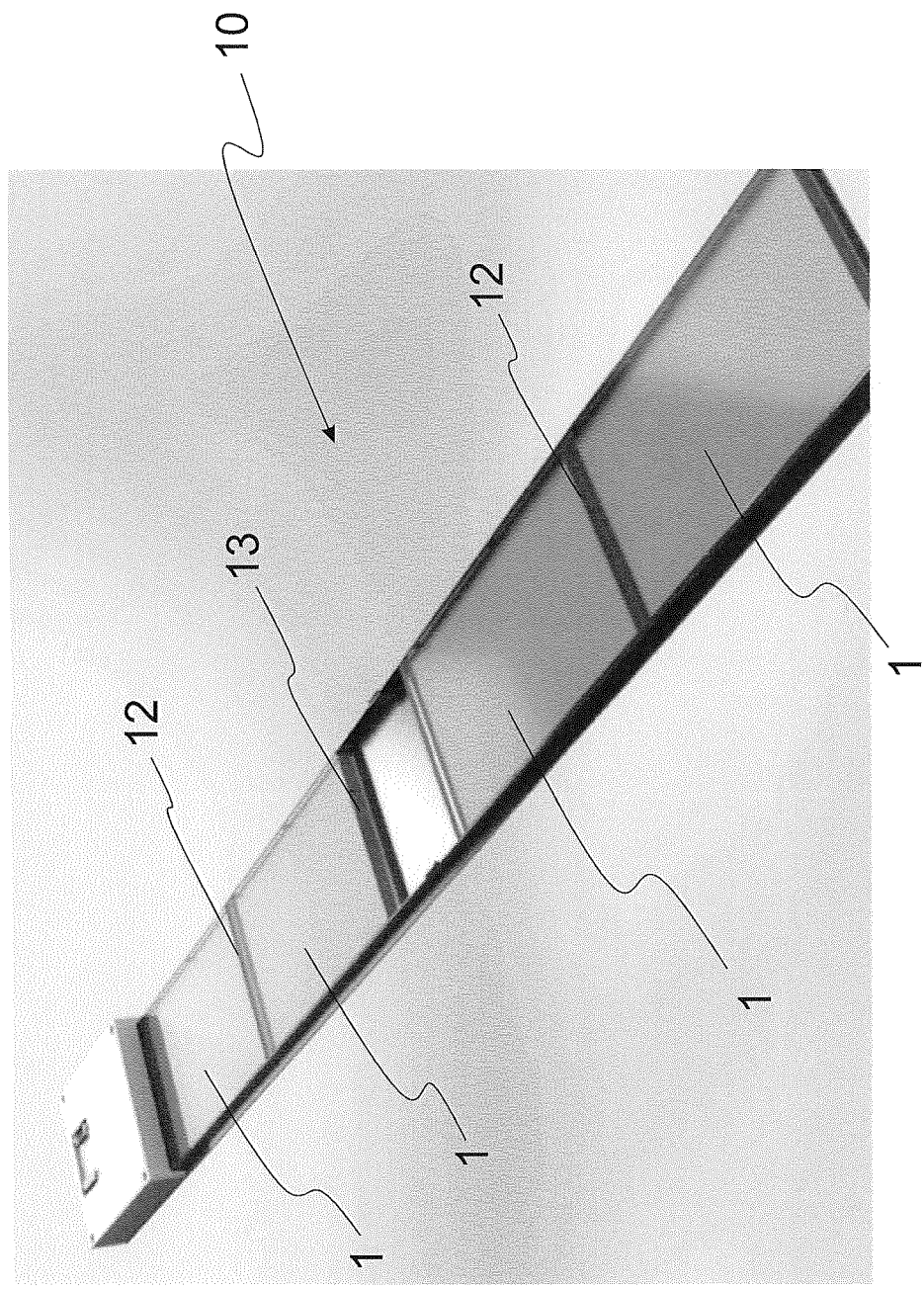
FIG. 1 shows a schematic drawing of an embodiment of a panel radiation detector in a perspective view.

FIG. 1 shows a schematic drawing of an embodiment of a panel radiation detector 10 in a perspective view. The panel radiation detector 10 comprises four plastic scintillator slabs 1, e.g. made of PVT, where two of the scintillator slabs 1 are each adjoining to each other at interfaces or edges 12, respectively. SiPM sensors (not visible in FIG. 1) are arranged at the edges 12, but also at the edges 13 of scintillator slabs 1 which are not adjoining to other scintillator slabs 1. The scintillator slabs 1 have a rectangular shape and the interfaces between adjoining scintillator slabs 1 are formed along the short edges 12 of the scintillator slabs 1.

Figure 2:
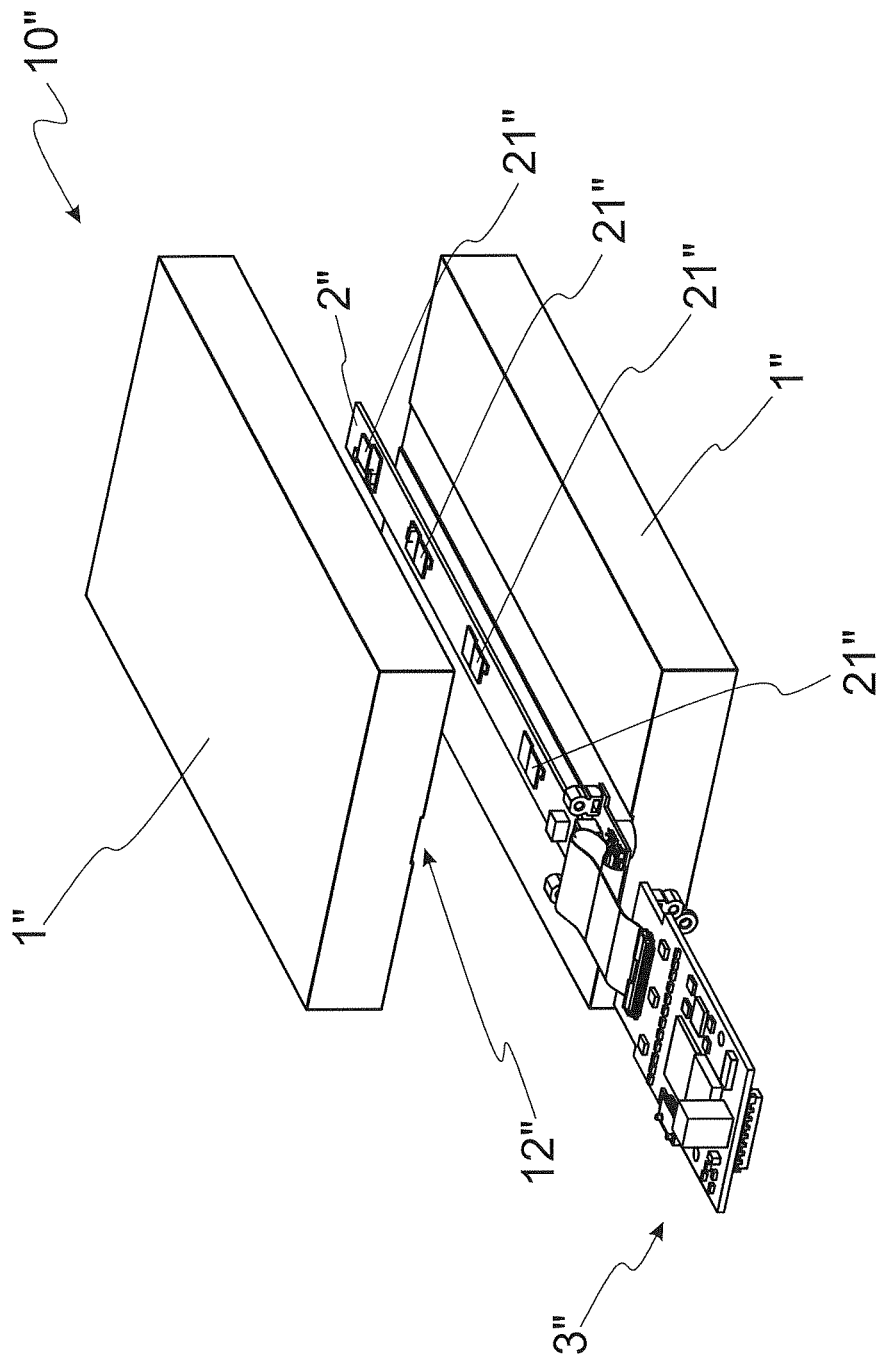
FIG. 2 shows a schematic drawing of an embodiment of a panel radiation detector in an exploded view.
Figure 3:
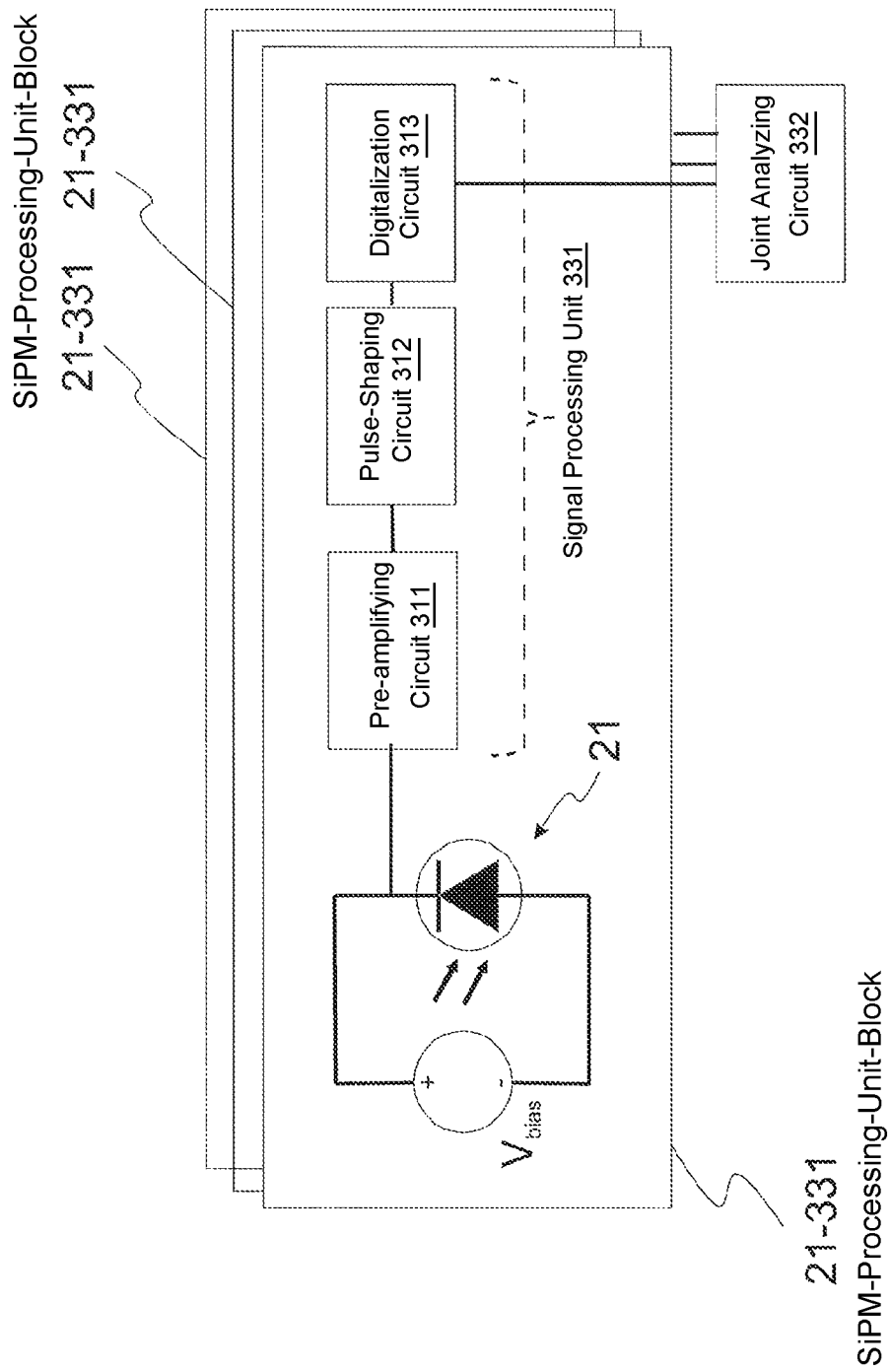
FIG. 3 shows a block diagram of a SiPM sensor connected to a processing unit and an analyzing circuit.

FIG. 2 shows a part of the panel radiation detector 10" in an exploded view. The scintillator slabs 1" are vertically adjoining at their respective top and bottom surfaces. At the bottom surface or edge 12", respectively, there is arranged a strip 2" of a printed circuit board (PCB) on which four SiPM sensors 21" are equidistantly arranged. The SiPM sensors 21" are configured to detect the scintillation light originating from the top scintillator slab 1". In the assembled configuration of the panel radiation detector 10", the strip 2" with the SiPM sensors 21" is therefore embedded between the two scintillator slabs 1". The SiPM sensors 21" are connected to a signal processing board 3" comprising processing units assigned to each SiPM sensor 21" and an analyzing circuit. FIG. 3 shows a block diagram of a SiPM sensor 21 connected to a processing unit 331 and an analyzing circuit 332. The processing unit 331 comprises a pre-amplifying circuit 311 where the detection signal from the SiPM sensor 21 is pre-amplified, a pulse-shaping circuit 312 where pulse-shaping is performed on the pre-amplified signal, and a digitization circuit 313 where the pulse-shaped signal is digitized. The digitization circuit 313 is configured to execute 1-bit digitization. Each SiPM sensor 21 of the panel radiation detector exhibits a processing unit 331 assigned to the respective SiPM sensor 21. Thus, SiPM-processing-unit-blocks 21-331 are defined, which are illustrated by three sequential boxes 21-331 in FIG. 3. The three sequential boxes 21-331 of SiPM-processing-unit-blocks may be part of a common strip which detects scintillation light of a specific scintillation slab. The processing units 331 or the digitization circuits 313, respectively, are each connected to a joint analyzing circuit 332. The analyzing circuit 332 performs signal analysis by determining coincident digitized signals associated with a radiation event, summing up the coincident digitized signals associated with a radiation event, and determining the pulse width of the summed up signal for determining the energy of the detected radiation event. The analyzing circuit 332 may comprise a field programmable gate array (FPGA), microcontroller, microprocessor and/or other electronic circuitry.

Figure 4:
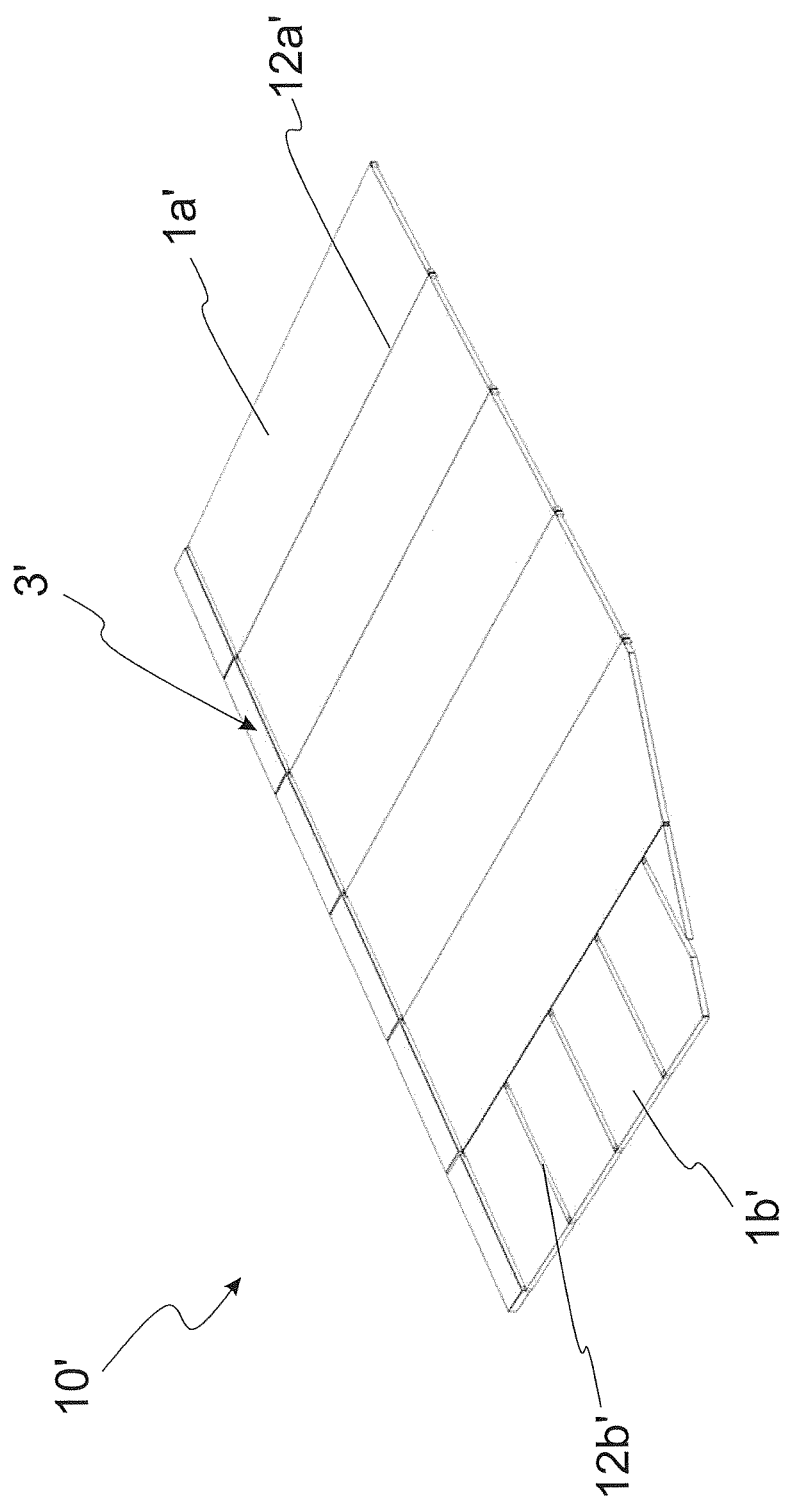
FIG. 4 shows a schematic drawing of an embodiment of a panel radiation detector in a perspective view.
Figure 5:
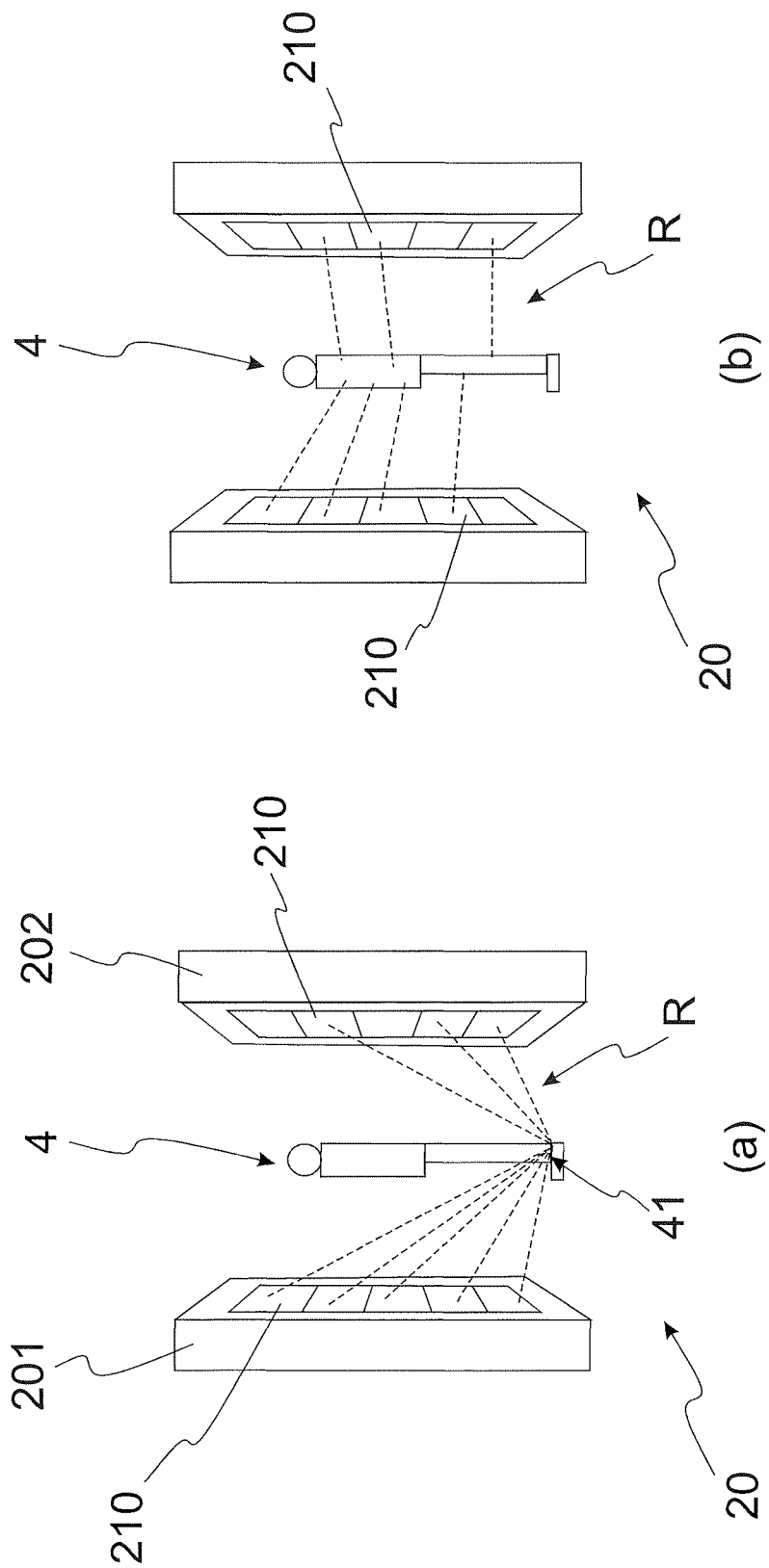
FIG. 5 shows two schematic drawings of an embodiment of a radiation detecting hallway comprising a plurality of panel radiation detectors.

FIG. 4 shows a schematic drawing of an embodiment of a panel radiation detector 10' in a perspective view. The panel radiation detector 10' comprises laterally adjoining plastic scintillator slabs 1a' and 1b'. The scintillator slabs 1a' are larger than the scintillator slabs 1b' and adjoin each other at edges 12a'. The interfaces between the scintillator slabs 1a' are formed by the long edges 12a' of adjoining scintillator slabs 1a'. The scintillator slabs 1b' also adjoin each other at their long edges 12b'. In addition, the scintillator slabs 1b' adjoin with their short edges to one of the scintillator slabs 1a' at its long edge. At a common edge of the scintillator slabs 1a' and one of the scintillator slabs 1b', there is arranged a signal processing board 3' with processing units assigned to each of the plurality of SiPM sensors and a joint analyzing circuit (not shown in FIG. 4). FIG. 5 shows two schematic drawings (a) and (b) of a radiation detecting hallway 20 comprising a plurality of panel radiation detectors 210. The hallway 20 comprises a first pillar 201 with panel radiation detectors 210 which are arranged in rows on top of each other and a second pillar 202 with panel radiation detectors 210 arranged in rows on top of each other. As shown in FIG. 5(a), a person 4 is positioned in a radiation detecting area defined between the first pillar 201 and the second pillar 202 and screed by the panel radiation detectors 210. The panel radiation detectors 210 detect radiation R emerging from the person 4. By correlating the strength of the detection signals of the SiPM sensors of the panel radiation detectors 210, the radiation source 41 located at the foot of the person 4 can be localized. The localization of the radiation source 41 at a small area of the foot of the person 4 points to an illicit radiation source. FIG. 5(b) shows another situation where a person 4 is screened in the radiation detecting hallway 20 but does not carry an illicit radiation source. The panel radiation detectors 210 detect radiation R which source can be localized to the person 4, but originates from the whole body of the person 4. The localization to a large area compared to the situation in FIG. 5(a) points to a licit radiation source, such as originating from nuclear medicine.

Figure 6:
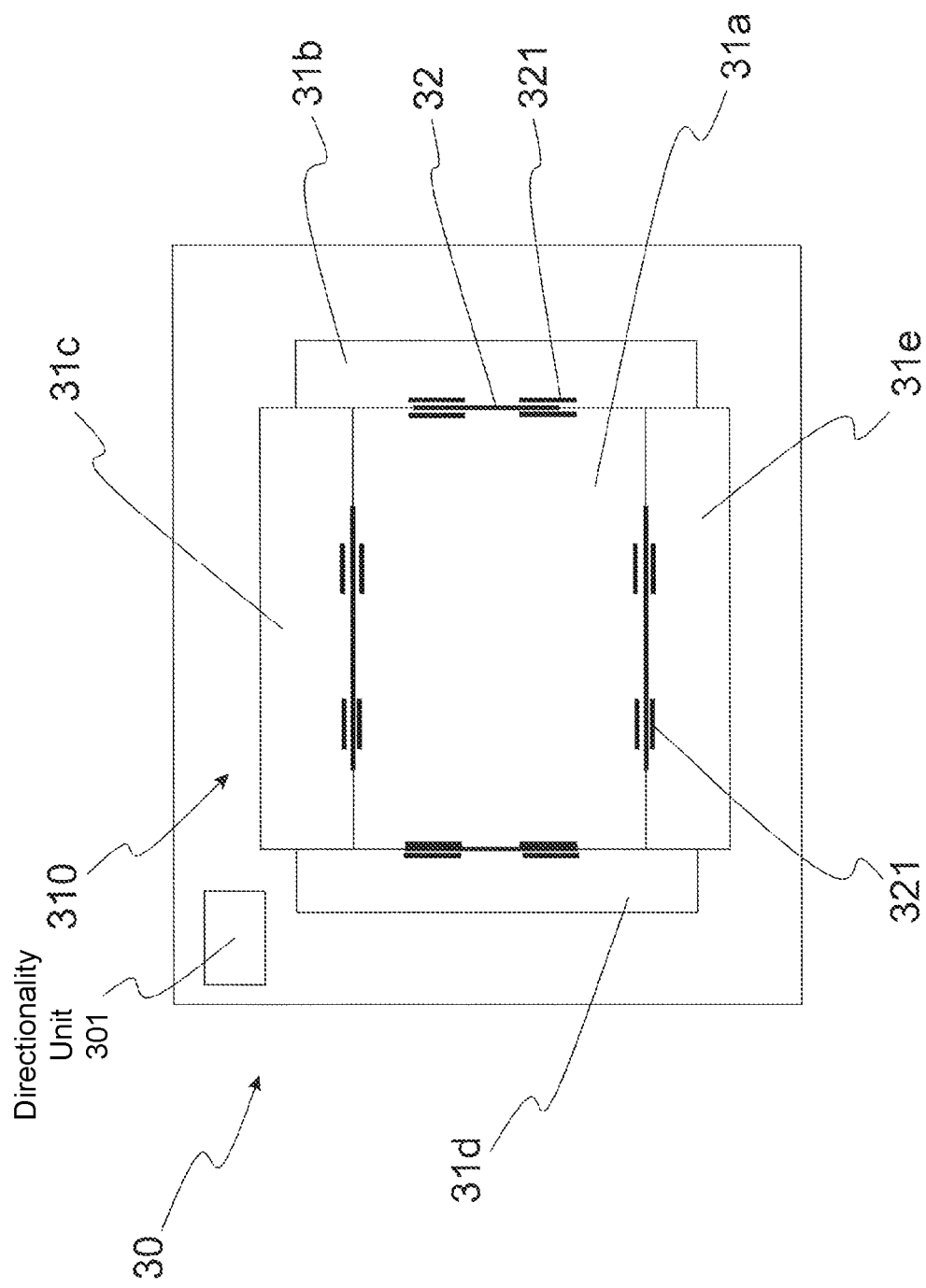
FIG. 6 shows a block diagram of an embodiment of a radiation detecting drone comprising a panel radiation detector.

FIG. 6 shows a block diagram of a radiation detecting drone 30 comprising a panel radiation detector 310. The panel radiation detector 310 comprises a central scintillator slab 31a and four peripheral scintillator slabs 31b-e. Strips 32 with SiPM sensors 321 are arranged at the respective interfaces between the central scintillator slab 31a and the peripheral scintillator slabs 31b-e. SiPM sensors 321 are arranged on a first surface and a second surface of each of the strips 2 or at an edge of each scintillator slab 31a-e, respectively, such that the scintillation light of the scintillator slabs 31a-e can be detected by the SiPM sensors 321 oriented towards the respective scintillator slab. The radiation detecting drone 30 comprises a directionality unit 301 which is configured to determine the directionality of incident ionizing radiation by correlating the strengths of detection signals of the SiPM sensors 321.

Figure 7:
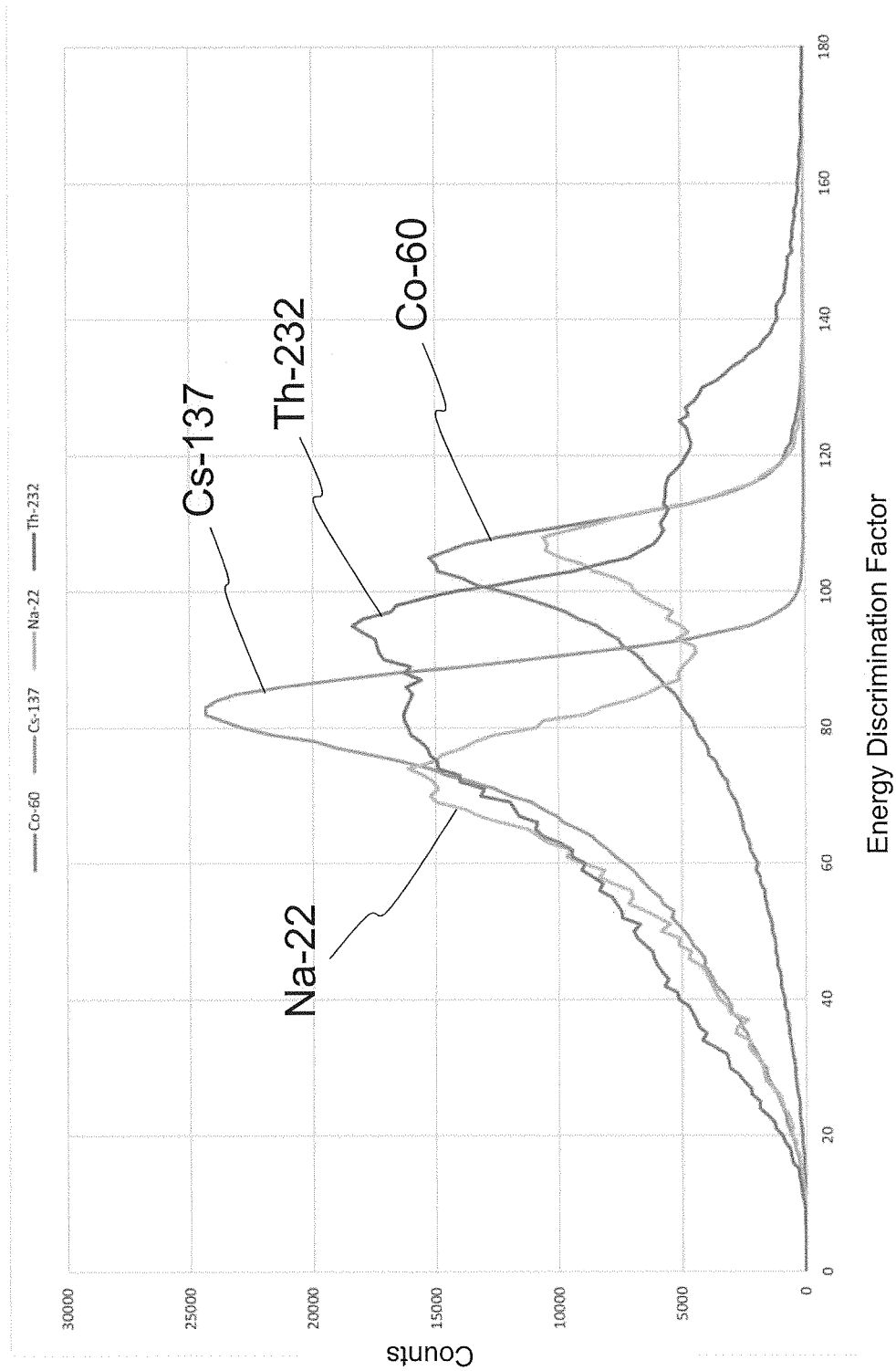
FIG. 7 shows a spectral response of a panel radiation detector according to the present invention.

FIG. 7 shows a measured spectral response of a panel radiation detector according to the present invention for Na-22, CS-137, Co-60 and Th-232.

Figure 8:
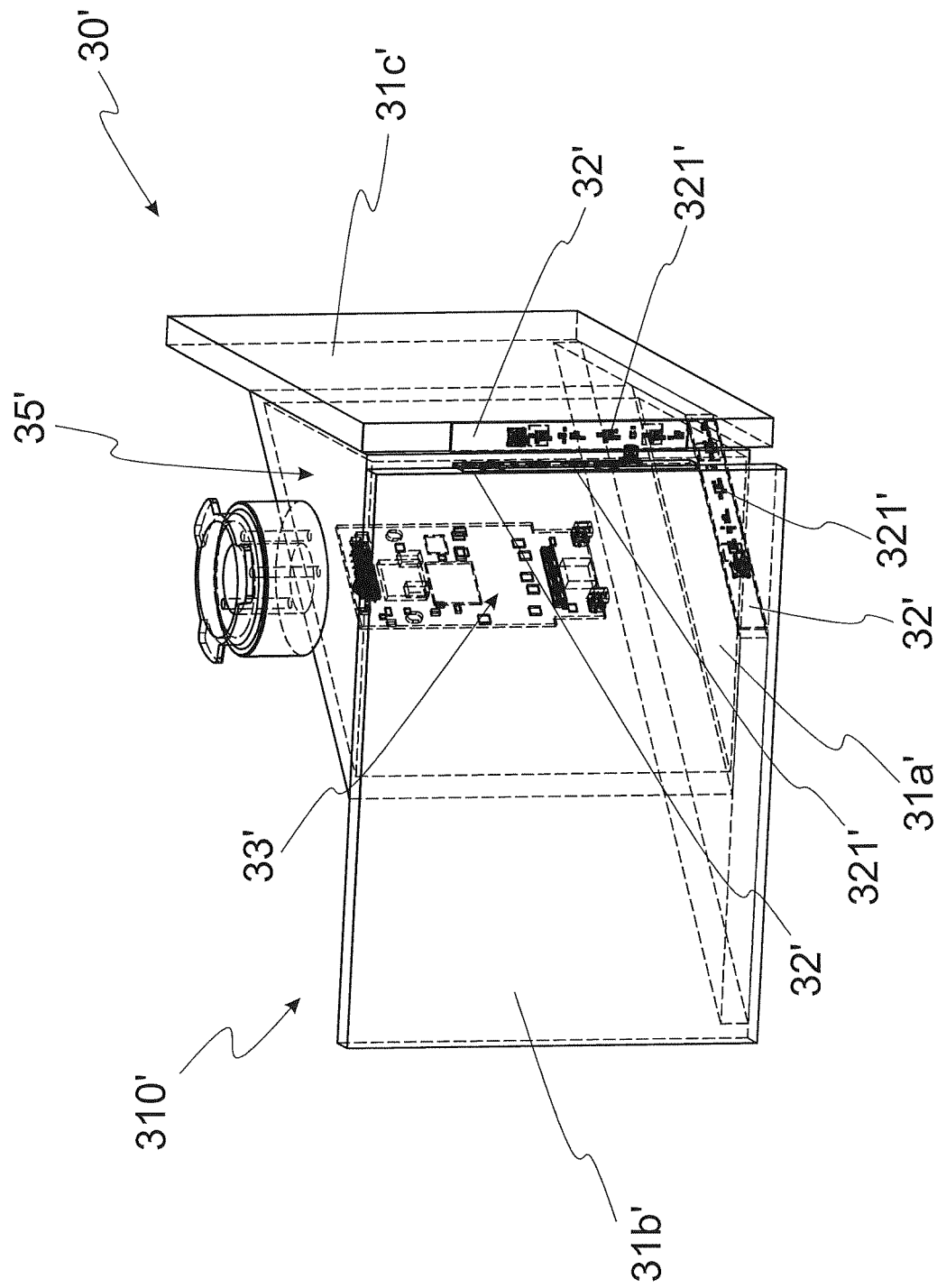
FIG. 8 shows a schematic drawing of an embodiment of a radiation detecting drone comprising a panel radiation detector.

FIG. 8 shows a schematic drawing of an embodiment of a radiation detecting drone 30' comprising a panel radiation detector 310' (only the part of the drone 30' related to the panel radiation detector 310' is shown). The panel radiation detector 310' comprises a central scintillator slab 31a' and two peripheral scintillator slabs 31b' and 31c'. The central scintillator slab 31a' is arranged in a plane which is perpendicular to a plane in which the peripheral scintillator slab 31b' is arranged and which is perpendicular to a plane in which the peripheral scintillator slab 31c' is arranged. Each scintillator slab 31a'-c' features an edge at which a strip 32' is arranged. The strips 32' comprise a plurality of SiPM sensors 321' arranged on the strips 32' and configured to detect the scintillation light originating from the respective scintillator slab 31a'-c'. The panel radiation detector 310' further comprises a signal processing board 33' which comprises processing units assigned to the SiPM sensors 321' and a joint analyzing circuit. The drone 30' includes a plastic support element 35' for supporting the signal processing board 33' and the structure of the panel radiation detector 310'.

Figure 9:
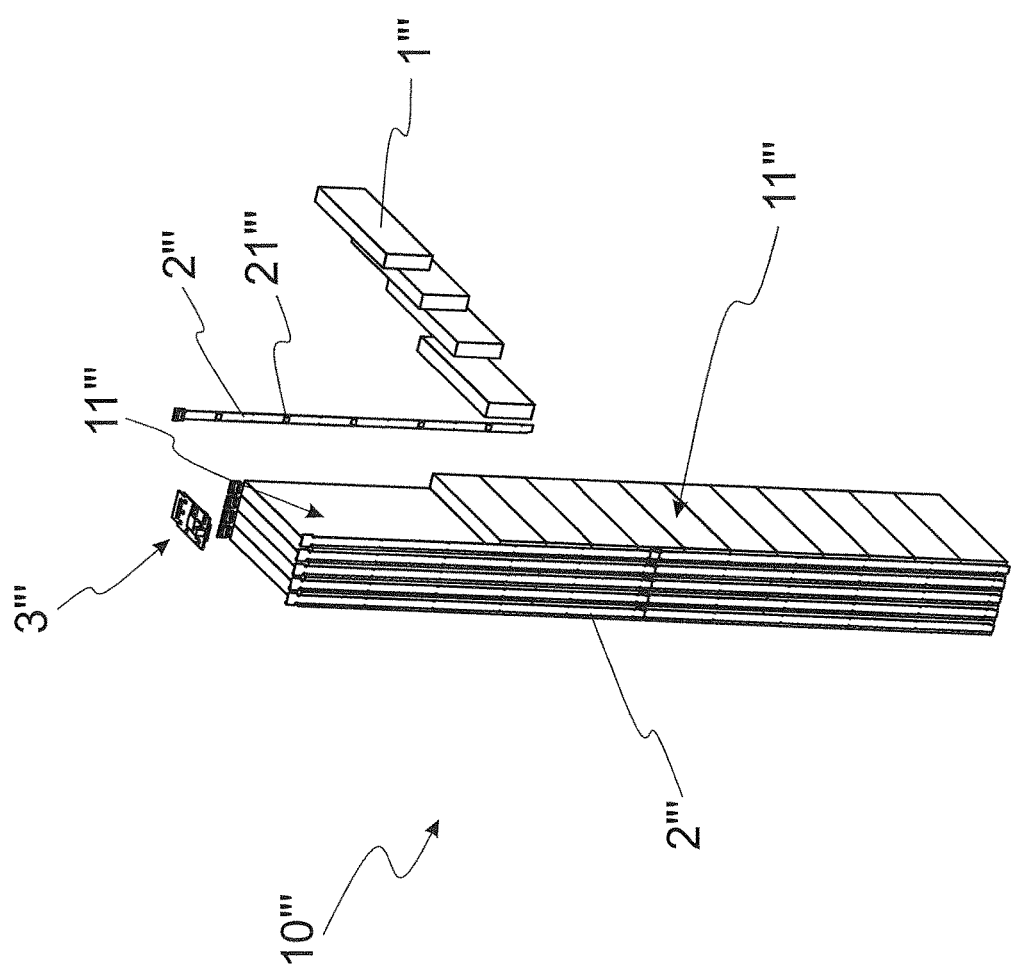
FIG. 9 shows a schematic drawing of an embodiment of a panel radiation detector in a perspective view.

FIG. 9 shows a schematic drawing of an embodiment of a panel radiation detector 10' in a perspective as well as in a partially exploded view. The panel radiation detector 10''' comprises a plurality of plastic scintillator slabs 1''' which are laterally adjoining each other, whereby five groups 11''' of laterally adjoining plastic scintillator slabs 1''' are formed. The groups 11''' are stacked on top of each other such that a multi-layer panel radiation detector 10''' is obtained. At each lateral edge of a group 11''', there is arranged a strip 2' comprising a plurality of SiPM sensors 21''' configured to detect scintillation light from each plastic scintillator slab 1'. The multi-layer panel radiation detector 10''' comprises a signal processing board 3''' comprising processing units assigned to each SiPM sensor 21' and a joint analyzing circuit.

Figure 10:
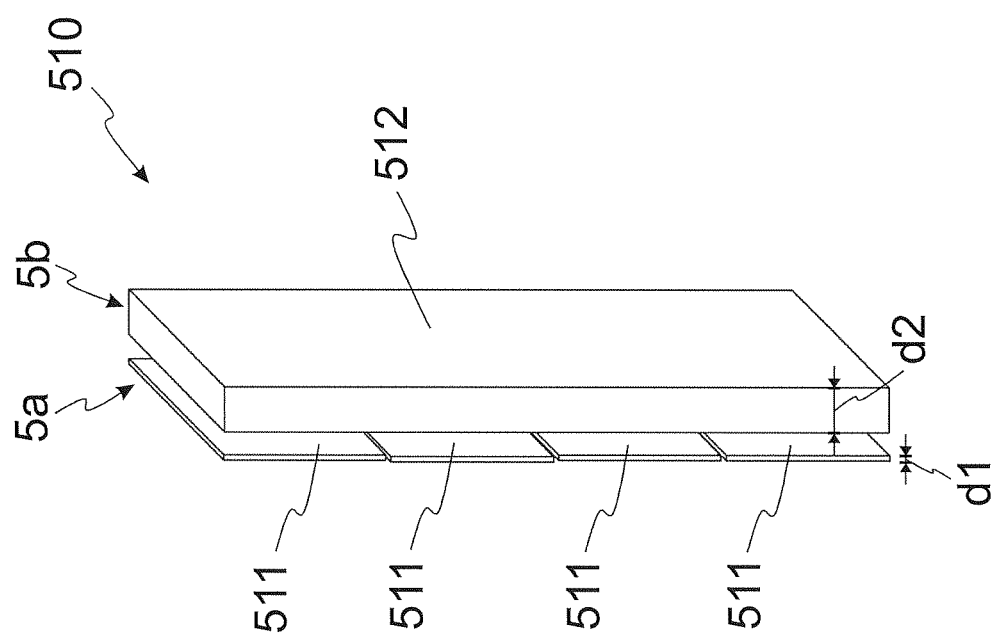
FIG. 10 shows a schematic drawing of an arrangement of plastic scintillator slabs of an embodiment of a panel radiation detector in a perspective view.

FIG. 10 shows a schematic drawing of an arrangement of plastic scintillator slabs 511 and 512 of an embodiment of a panel radiation detector 510 in a perspective view. For simplicity, only the plastic scintillator slabs 511, 512 are shown and other components of the panel radiation detector 510 such as for example the SiPM sensors are omitted in the drawing. The panel radiation detector 510 comprises four first plastic scintillator slabs 511 which are laterally adjoining to each other. The panel radiation detector 510 further comprises a single second plastic scintillator slab 512 which is vertically stacked on top of the four first plastic scintillator slabs 511. In this context, it is clear to the person skilled in the art that "top" does not imply an absolute direction in space but is rather directed to the relative arrangement of the plastic scintillator slabs 511 and 512 to each other. The four first plastic scintillator slabs 511 have a smaller thickness d1 than the thickness d2 of the second plastic scintillator slab 512. The four first plastic scintillator slabs 511 are part of a thinner front panel 5a and optimized for the detection of low energy gamma radiation. The second plastic scintillator slab 512 is part of a thicker rear panel 5b and optimized for the detection of high energy gamma radiation. The person skilled in the art understands that the illustration shown in the drawing may, for some embodiments, represent a section of the total arrangement of plastic scintillator slabs 511, 512 such that the panel radiation detector 510 may effectively comprise more than four first plastic scintillator slabs 511. Additionally, the panel radiation detector 510 may comprise more than a single second plastic scintillator slab 512. However, even in embodiments with more than a single second plastic scintillator slab 512, the number of first plastic scintillator slabs 511 is greater than the number of second plastic scintillator slabs 512.

Figure 11:
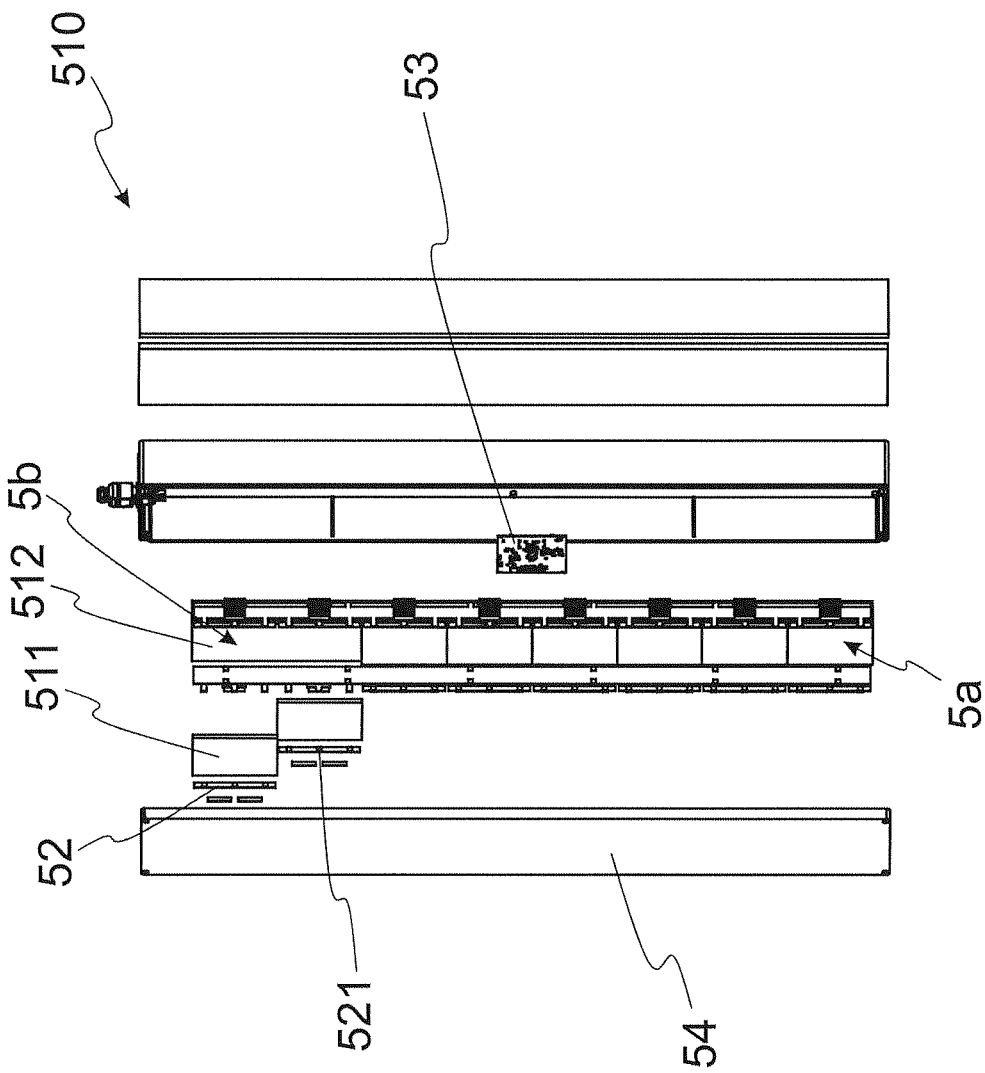
FIG. 11 shows a schematic drawing of an embodiment of a panel radiation detector in a partially exploded view with an arrangement of plastic scintillator slabs according to FIG. 10.

FIG. 11 shows a schematic drawing of an embodiment of a panel radiation detector 510 in a partially exploded view with an arrangement of a plurality of first plastic scintillator slabs 511 and a single second plastic scintillator slab 512 according to FIG. 10. The first plastic scintillator slabs 511 are part of a thinner front panel 5a and the second plastic scintillator slab 512 is part of a thicker rear panel 5b. Elongated strips 52 of PCBs with SiPMs 521 are arranged at lateral edges of the plastic scintillator slabs 511, 512. A signal processing board 53 is arranged next to the second plastic scintillator slab 512. An ingress protection wall 54 is arranged next to the thinner front panel 5a and faces a monitoring area of the panel radiation detector 510. Thus, low energy gamma radiation from a radiation source positioned in the monitoring area of the panel radiation detector 510 next to the ingress protection wall 54 first impinges on the thinner front panel 5a where the low energy gamma radiation can be detected due to scintillation in the first plastic scintillator slabs 511. High energy gamma radiation from the radiation source, however, passes the thinner front panel 5a substantially unattenuated and impinges on the thicker rear panel 5b where the high energy gamma radiation can be detected due to scintillation in the second plastic scintillator slab 512.

Figure 12:
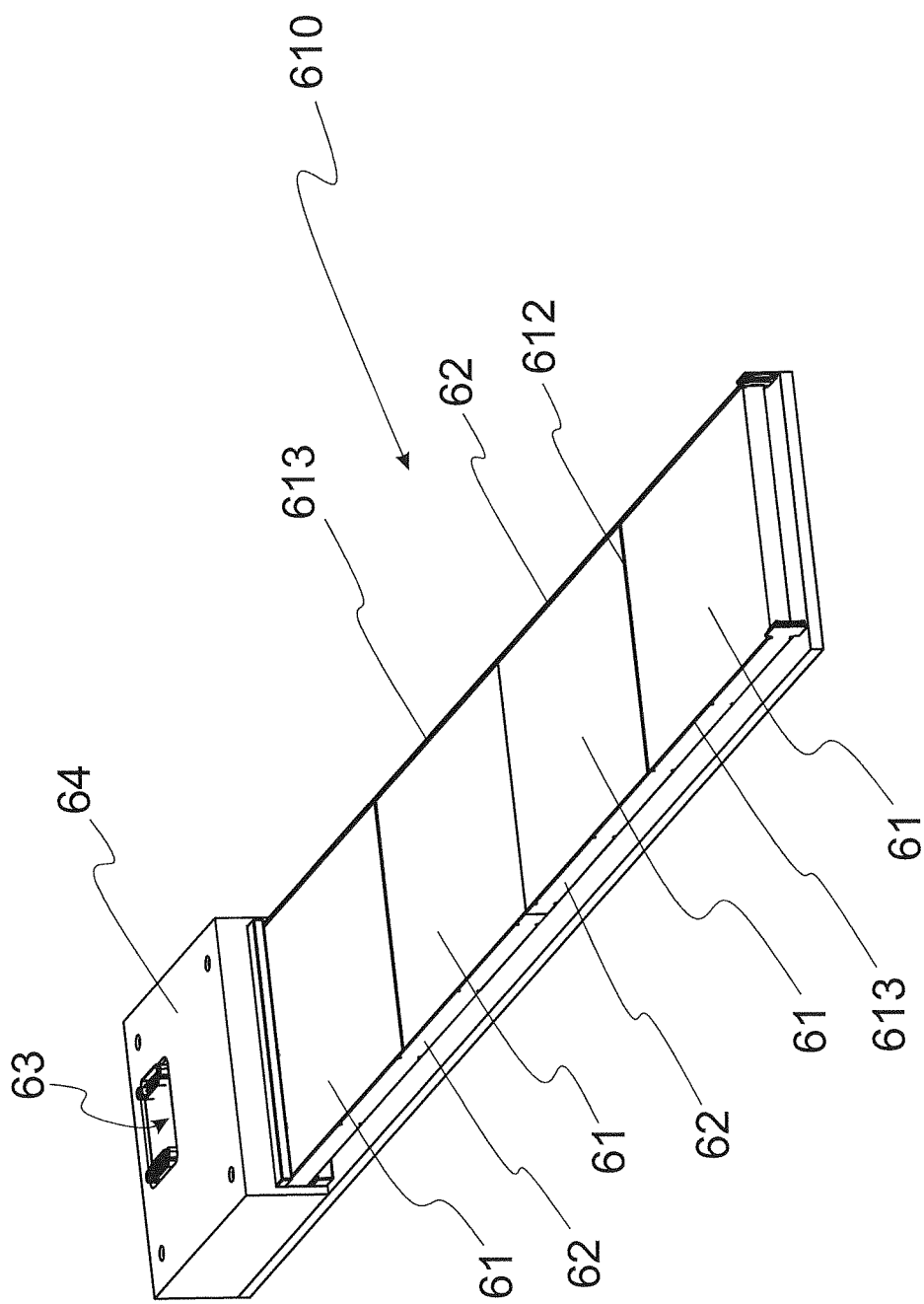
FIG. 12 shows a schematic drawing of an embodiment of a panel radiation detector in a perspective view.

FIG. 12 shows a schematic drawing of an embodiment of a panel radiation detector 610 in a perspective view. The panel radiation detector 610 comprises four plastic scintillator slabs 61, e.g. made of PVT, which are adjoining to each other at interfaces or edges 612, respectively. SiPM sensors (not visible in FIG. 12) are arranged on elongated strips 62 of PCBs at edges 613 of the scintillator slabs 61. The scintillator slabs 61 have a rectangular shape and the interfaces between adjoining scintillator slabs 61 are formed along the edges 12 of the scintillator slabs 61. The SiPM sensors are connected to a signal processing board 63 comprising processing units assigned to each SiPM sensor and an analyzing circuit contained in a protective box 64.

Figure 13:
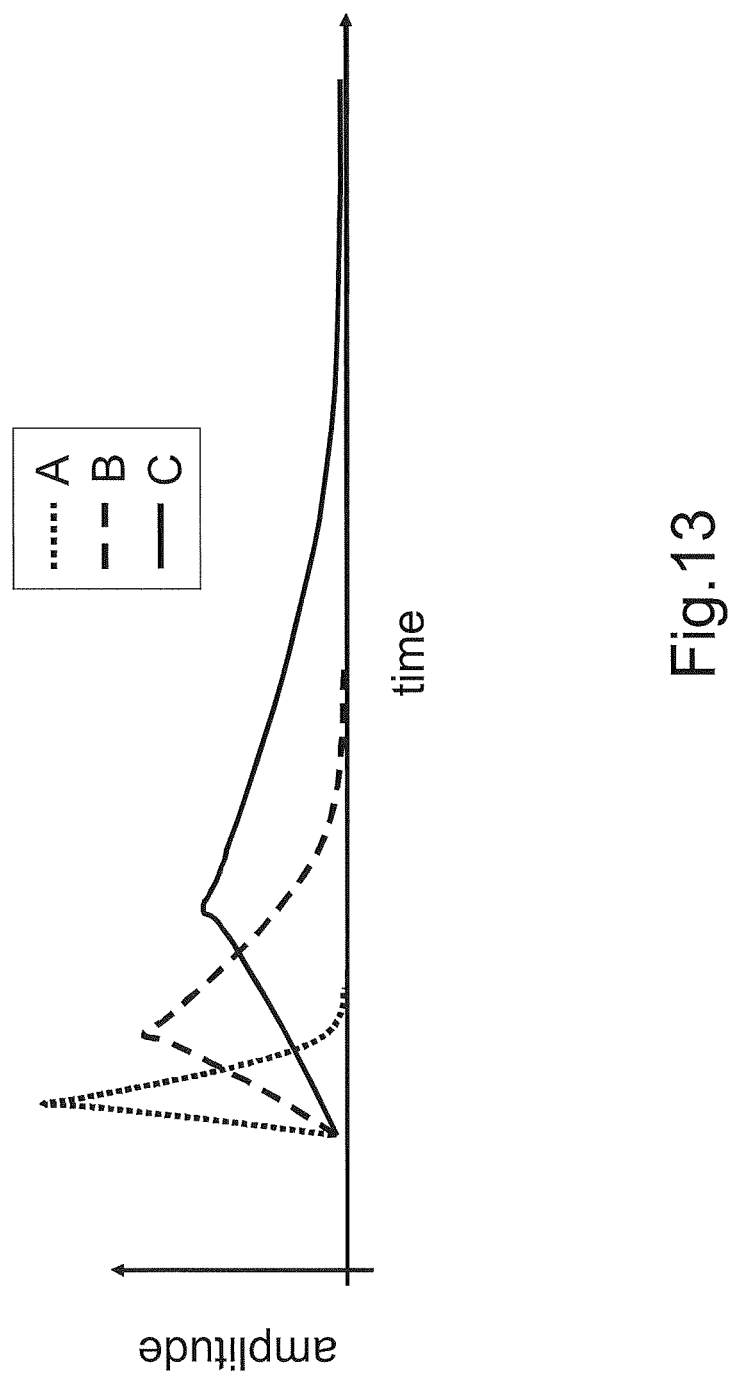
FIG. 13 shows a schematic representation of an example of shaping a detection signal.

FIG. 13 shows a schematic representation of an example of shaping a pulse or detection signal, respectively. An original scintillator pulse is shown by the dotted line A. A SiPM sensor which detects the scintillation light of the scintillator pulse A generates an electrical pulse or signal, respectively, which is shown by the dashed line B. The electrical signal from the SiPM sensor is pulse-shaped by a pulse-shaping circuit resulting in a pulse-shaped signal as shown by the solid line C, which can be digitized by a digitization circuit.

LIST OF DESIGNATIONS

10, 10', 10", 10'", 210, 310, 310', 510, 610 panel radiation detector
20 radiation detecting hallway
201 first pillar
202 second pillar
30, 30' radiation detecting drone
301 directionality unit
35' plastic support element
1, 1a'-b', 1", 1'", 31a-e, 31a"-c', 511, 512, 61 plastic scintillator slab
11'" group
12, 12a'-b', 12", 612 edge
13, 613 edge
2, 2", 2'", 32, 32', 52, 62 strip
21, 21", 21'", 321, 321', 521 SiPM sensor
3, 3', 3", 3'", 33', 53, 63 signal processing board
331 signal processing unit
311 pre-amplifying circuit
312 pulse-shaping circuit
313 digitization circuit
332 joint analyzing circuit
21-331 SiPM-processing-unit-block
4 person
41 radiation source
5a thinner front panel
5b thicker rear panel
54 ingress protection wall
64 protective box
R radiation

The invention claimed is:

1. A panel radiation detector for detecting radiation event(s) of ionizing radiation, comprising:
   a plurality of adjoining plastic scintillator slabs,
   a plurality of silicon photomultiplier sensors arranged at an edge of at least one of the plurality of adjoining plastic scintillator slabs and configured to detect scintillation light generated in the plurality of adjoining plastic scintillator slabs responsive to radiation event(s),
   a plurality of signal processing units, each of the plurality of signal processing units being connected to one of the plurality of silicon photomultiplier sensors, wherein each of the plurality of signal processing units comprises a digitization circuit configured to generate a digitized signal for a signal analysis by executing a 1-bit digitization of a detection signal generated by at least one of the plurality of silicon photomultiplier sensors in response to the detected scintillation light for determining an energy of detected radiation event(s),
   a pre-amplifying circuit configured to pre-amplify the detection signal generated by the at least one of the plurality of silicon photomultiplier sensors, and
   a pulse-shaping circuit configured to pulse-shape the pre-amplified detection signal, wherein the digitization circuit is configured to execute the 1-bit digitization of the pulse-shaped pre-amplified detection signal.

2. The panel radiation detector according to claim 1, further comprising:
   a joint analyzing circuit connected to the digitization circuit and configured to perform a signal analysis by executing the steps comprising:
      determining coincident digitized signals associated with a radiation event,
      summing up the coincident digitized signals associated with the radiation event, and
      determining a pulse width of a summed-up signal for determining the energy of the radiation event.

3. The panel radiation detector according to claim 2, wherein the joint analyzing circuit is configured to separately perform, for each adjoining plastic scintillator slab, a signal analysis of the detection signal generated by at least one of the plurality of silicon photomultiplier sensors in response to the detected scintillation light generated in a respective adjoining plastic scintillator slab.

4. The panel radiation detector according to claim 1, wherein the plurality of silicon photomultiplier sensors comprises two to eight silicon photomultiplier sensors, wherein the two to eight silicon photomultiplier sensors are arranged at an edge of at least one of the plurality of adjoining plastic scintillator slabs.

5. The panel radiation detector according to claim 4, further comprising:
   an elongated strip, wherein the plurality of silicon photomultiplier sensors is arranged on the elongated strip and equally spaced from each other.

6. The panel radiation detector according to claim 1, wherein each of the plurality of adjoining plastic scintillator slabs is rectangular and comprises a long edge and a short edge, wherein at least a portion of the plurality of adjoining plastic scintillator slabs adjoin along their respective long edges.

7. The panel radiation detector according to claim 1, wherein each of the plurality of adjoining plastic scintillator slabs is rectangular and comprises a long edge and a short edge, wherein respective short edges of a plurality of adjoining plastic scintillator slabs adjoin a single adjoining plastic scintillator slab along its long edge.

8. The panel radiation detector according to claim 1, wherein at least two adjoining plastic scintillator slabs of the plurality of adjoining plastic scintillator slabs laterally adjoin each other.

9. The panel radiation detector according to claim 1, wherein at least two adjoining plastic scintillator slabs of the plurality of adjoining plastic scintillator slabs are vertically stacked on top of each other.

10. The panel radiation detector according to claim 1, wherein the plurality of adjoining plastic scintillator slabs comprises:
    at least one first plastic scintillator slab, and
    at least one second plastic scintillator slab,
    wherein the at least one first plastic scintillator slab and the at least one second plastic scintillator slab are vertically stacked on top of each other, and
    wherein the at least one first plastic scintillator slab has a thickness smaller than a thickness of the at least one second plastic scintillator slab.

11. The panel radiation detector according to claim 10, wherein the thickness of the at least one second plastic scintillator slab is 4 to 20 times larger than the thickness of the at least one first plastic scintillator slab.

12. The panel radiation detector according to claim 10, wherein the thickness of the at least one first plastic scintillator slab is 1 to 4 times a side of an active area of one of the plurality of silicon photomultiplier sensors arranged at an edge of the at least one first plastic scintillator slab.

13. The panel radiation detector according to claim 10, wherein the thickness of the at least one first plastic scintillator slab is 3 mm to 15 mm.

14. The panel radiation detector according to claim 1, further comprising:
a front panel comprising a plurality of laterally-adjoining first plastic scintillator slabs of the plurality of adjoining plastic scintillator slabs, and
a rear panel comprising a single second plastic scintillator slab of the plurality of adjoining plastic scintillator slabs,
wherein the front panel is thinner than the rear panel.

15. A radiation detecting hallway comprising:
a plurality of panel radiation detectors, each of the plurality of panel radiation detectors is a panel radiation detector according to claim 1, arranged in rows, and
a first pillar,
wherein the rows of the plurality of panel radiation detectors are sequentially arranged on top of each other within the first pillar.

16. The radiation detecting hallway according to claim 15, further comprising:
a second pillar,
wherein the rows of the plurality of panel radiation detectors are sequentially arranged on top of each other within the second pillar, and
wherein the first pillar and the second pillar define a radiation detecting area between the first pillar and the second pillar.

17. A radiation detecting drone comprising:
a panel radiation detector according to claim 1; and
a support element for supporting the plurality of signal processing units and the panel radiation detector.

18. The radiation detecting drone according to claim 17, wherein the plurality of adjoining plastic scintillator slabs comprises:
a central plastic scintillator slab, and
at least two peripheral plastic scintillator slabs, wherein the at least two peripheral plastic scintillator slabs adjoin the central plastic scintillator slab on at least two edges of the central plastic scintillator slab, and
wherein the plurality of silicon photomultiplier sensors is arranged at an edge of the central plastic scintillator slab and at an edge of at least one of the at least two peripheral plastic scintillator slabs.

19. The radiation detecting drone according to claim 18, further comprising:
a processor configured to determine a directionality of an incident ionizing radiation by correlating a strength of each detection signal of the plurality of silicon photomultiplier sensors.

20. The radiation detecting drone according to claim 17, wherein the plurality of adjoining plastic scintillator slabs comprises:
a central plastic scintillator slab, and
three or four peripheral plastic scintillator slabs,
wherein the three or four peripheral plastic scintillator slabs adjoin the central plastic scintillator slab on at least two edges of the central plastic scintillator slab, and
wherein the plurality of silicon photomultiplier sensors is arranged at an edge of the central plastic scintillator slab and at an edge of at least one of the three or four peripheral plastic scintillator slabs.

21. A method for operating a radiation detecting hallway according to claim 15, the method comprising:
detecting scintillation light generated in the plurality of adjoining plastic scintillator slabs by the plurality of silicon photomultiplier sensors;
generating a detection signal by at least one of the plurality of silicon photomultiplier sensors in response to the detected scintillation light;
generating a digitized signal for a signal analysis by executing a 1-bit digitization of the detection signal by the digitization circuit for determining an energy of detected radiation event(s); and
localizing a source of ionizing radiation within the radiation detecting hallway by correlating a strength of each detection signal of the plurality of silicon photomultiplier sensors, which are disposed on different rows of the plurality of panel radiation detectors.

22. A method for processing a detection signal of a panel radiation detector for detecting radiation event(s) of ionizing radiation, the panel radiation detector comprising:
a plurality of adjoining plastic scintillator slabs,
a plurality of silicon photomultiplier sensors arranged at an edge of at least one of the plurality of adjoining plastic scintillator slabs, and
a plurality of signal processing units, each of the plurality of signal processing units being connected to one of the plurality of silicon photomultiplier sensors, wherein each of the plurality of signal processing units comprises a digitization circuit,
wherein the method comprises:
detecting scintillation light generated in the plurality of adjoining plastic scintillator slabs by the plurality of silicon photomultiplier sensors;
generating a detection signal by at least one of the plurality of silicon photomultiplier sensors in response to the detected scintillation light; and
generating a digitized signal for a signal analysis by executing a 1-bit digitization of the detection signal by the digitization circuit for determining an energy of detected radiation event(s),
wherein the panel radiation detector further comprises a joint analyzing circuit connected to the digitization circuit of each of the plurality of signal processing units, and
wherein the joint analyzing circuit performs a signal analysis by executing the steps comprising:
determining coincident digitized signals associated with a radiation event,
summing up the coincident digitized signals associated with the radiation event, and
determining a pulse width of a summed-up signal for determining the energy of the radiation event.

23. The method according to claim 22, wherein the joint analyzing circuit separately performs, for each adjoining plastic scintillator slab, a signal analysis of the detection signal generated by the at least one of the plurality of silicon photomultiplier sensors in response to the detected scintillation light generated in a respective adjoining plastic scintillator slab.

24. The method according to claim 22, wherein the panel radiation detector further comprises a pre-amplifying circuit and a pulse-shaping circuit, wherein the method further comprises:

pre-amplifying the detection signal generated by the at least one of the plurality of silicon photomultiplier sensors by the pre-amplifying circuit, pulse-shaping the pre-amplified detection signal by the pulse-shaping circuit, and executing the 1-bit digitization of the pulse-shaped pre-amplified detection signal by the digitization circuit.

* * * * *